United States Patent
Ziger

(10) Patent No.: US 10,810,339 B1
(45) Date of Patent: Oct. 20, 2020

(54) DETERMINATION OF DIMENSIONAL CHANGES OF FEATURES ACROSS MASK PATTERN SIMULATION FIELDS

(71) Applicant: Synopsys, Inc., Mountain View, CA (US)

(72) Inventor: David Howard Ziger, San Antonio, TX (US)

(73) Assignee: Synopsys, Inc., Mountain View, CA (US)

( * ) Notice: Subject to any disclaimer, the term of this patent is extended or adjusted under 35 U.S.C. 154(b) by 475 days.

(21) Appl. No.: 15/854,615

(22) Filed: Dec. 26, 2017

Related U.S. Application Data

(60) Provisional application No. 62/438,742, filed on Dec. 23, 2016.

(51) Int. Cl.
*G06F 30/367* (2020.01)
*G06F 119/18* (2020.01)

(52) U.S. Cl.
CPC ........ *G06F 30/367* (2020.01); *G06F 2119/18* (2020.01)

(58) Field of Classification Search
None
See application file for complete search history.

(56) References Cited

U.S. PATENT DOCUMENTS

| | | | |
|---|---|---|---|
| 8,701,055 B1* | 4/2014 | Lee | G06F 30/398 |
| | | | 716/54 |
| 2004/0040002 A1* | 2/2004 | Rodin | G06T 7/68 |
| | | | 716/51 |
| 2009/0187871 A1* | 7/2009 | Cork | G03F 1/36 |
| | | | 716/119 |
| 2009/0228860 A1* | 9/2009 | Okada | G03F 1/36 |
| | | | 716/50 |
| 2012/0208111 A1* | 8/2012 | Moon | G03F 1/36 |
| | | | 430/5 |

OTHER PUBLICATIONS

Jiao, Hailong et al. "Cellwise OPC Based on Reduced Standard Cell Library", 2008, 9th International Symposium on Quality Electronic Design, IEEE. (Year: 2008).*

* cited by examiner

*Primary Examiner* — Cedric Johnson
(74) *Attorney, Agent, or Firm* — Fenwick & West LLP

(57) ABSTRACT

A method of determining dimensional changes of features in a mask involves calculating a spacing to be used between adjacent unit cells, correcting a unit cell surrounded by replicas of the same unit cell at the calculated spacing for optical proximity effects, arraying the proximity corrected unit cell at the calculated spacing, and dividing the array of unit cells into templates. Each template frames a portion of the array of unit cells, and locations of the unit cells in each framed template are shifted relative to locations of the unit cells in other framed templates. Critical dimensions for features in the unit cell are determined within each template, and the critical dimensions determined across the template are used to obtain shift variances of each feature. A dimensional change is determined for a feature based on the shift variance for that feature.

20 Claims, 8 Drawing Sheets

DETERMINATION OF DIMENSIONAL CHANGES OF FEATURES ACROSS MASK PATTERN SIMULATION FIELDS

CROSS REFERENCE TO RELATED APPLICATIONS

This application claims the benefit of priority under 35 USC 119(e) to U.S. Provisional Application No. 62/438,742, filed on Dec. 23, 2016, which is incorporated herein by reference in its entirety for all purposes.

TECHNICAL FIELD

The present disclosure relates generally to computer simulation of physical processes, and more particularly to the simulation of semiconductor mask pattern features.

BACKGROUND

The intent of computer simulation, run on a single computer or a network of computers, is to reproduce behavior of a physical system. Computer simulations have become a useful part of mathematical modeling of many natural systems in physics (computational physics), electronics, chemistry, and engineering. Simulation of a system is represented as the computer execution of the system's model. Computer simulation may be used to explore and gain insights into new technology and to estimate the performance or other behaviors of complex systems. In turn, this may lead to overall improvement of system performance.

The manufacture of semiconductors requires patterning of microscopic features on substrates, often by extending the resolution of exposure tools with masks that are corrected for proximity effects. Device characteristics are typically dependent on the sizes of these microscopic features, so that maintaining dimensional control affects performance characteristics that determine yield. Simulation is an important tool to predict device performance and to create mask features that pattern within required geometrical constraints.

Simulation is often performed utilizing field techniques in which the mask is broken up into regions sampled at regular increments. For example, a simulation engine may rigorously simulate optical effects at regular points within the simulation field, such as 1024×1024 points spaced in a grid, with neighboring points 15 nm apart. Field interpolation techniques are used to predict behavior between the simulation grid points.

A significant challenge for engineers is to accurately simulate critical dimensions of features independent of where they may be placed in the simulation field. A critical dimension determined for a feature positioned at one location within the simulation field may be different from the critical dimension if that feature is positioned at a different location within the simulation field. For example, the determined critical dimension for a feature when that feature is located close to a simulation point may be different from the determined critical dimension for the same feature if the feature is located halfway between two simulation points. This difference in measurement may not represent a physical effect, and instead may be caused by the interpolation process used to estimate critical dimensions, inaccuracies in the rasterization of the mask, or other factors. Simulation shift variance is the technical term for the change in simulation results across a simulation field for the same feature in the same environment placed at different locations in the simulation field.

There are two common conventional approaches for calculating simulation shift variance. The first approach is to construct a regular array of the same mask pattern over a large area. If the mask patterns are identical and are arrayed at a regular spacing, then each pattern will have the same environment, provided that the measurements are not taken within an "influence" or "ambit" border around the array. Ambit refers to the distance at which neighboring geometries influence one another in the simulation shift variance model. The main problem with this approach is that it is limited to one type of feature, which has a specific geometry, whereas actual semiconductor devices are comprised of many types of geometries.

A second approach is to move a 'clump' of structures around the simulation field and measure some or all the features. A problem with this second approach is that it is tedious to create the needed cases and provide good coverage. For example, suppose a simulation field has 2048×2048 intensity points. Sampling each feature centered at each point would require (2048*48)*(2048*48) field/mask movement patterns where 48 is the number of patterns in the clump shown. In addition, the user must plan on sampling between the simulation field points.

BRIEF DESCRIPTION OF THE DRAWINGS

To easily identify the discussion of any particular element or act, the most significant digit or digits in a reference number refer to the figure number in which that element is first introduced.

DETAILED DESCRIPTION

Figure 1:
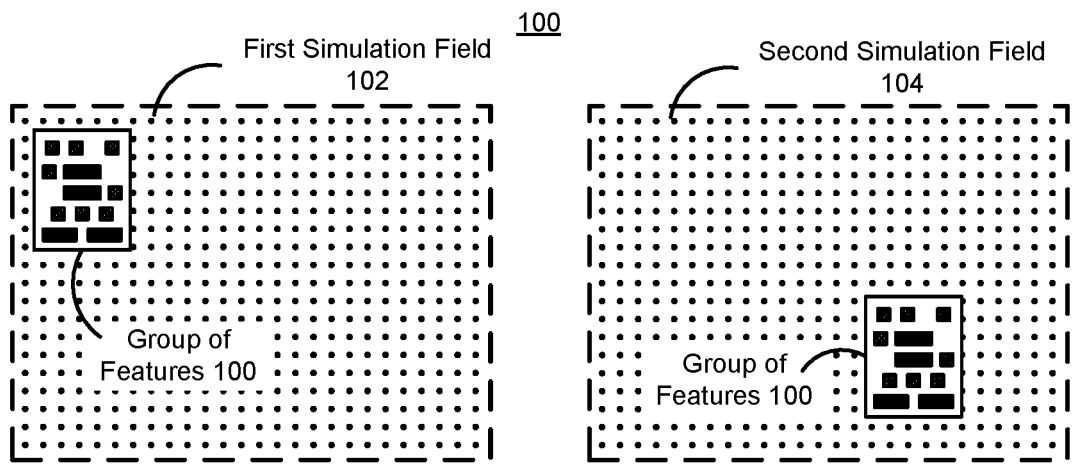
FIG. 1 illustrates a group of features 100 moved to different locations in the simulation field.

Herein various terminology is used and should be assigned its common meaning in the relevant arts, unless expressly defined below:

"Computer model" in this context refers to the logic (e.g., algorithms and equations) that represent the behavior of the system being modeled. Computer simulation is the actual execution of logic comprising these equations or algorithms. Simulation, therefore, is the process of executing a model.

"Ambit" herein refers to the maximum influence or maximum proximity distance that geometries have on a simulation result, such as critical dimension, intensity, or edge placement.

"Mask correction" herein refers to a mask layer calculated to compensate for optical and other effects in order to size to target.

"Unit cell" herein refers to a "group" of features in proximity.

"Corrected unit cell" herein refers to a unit cell that has one or more layers developed to correct for proximity effects.

"Circuitry" in this context refers to electrical circuitry having at least one discrete electrical circuit, electrical circuitry having at least one integrated circuit, electrical circuitry having at least one application specific integrated circuit, circuitry forming a general purpose computing device configured by a computer program (e.g., a general purpose computer configured by a computer program which at least partially carries out processes or devices described herein, or a microprocessor configured by a computer program which at least partially carries out processes or devices described herein), circuitry forming a memory device (e.g., forms of random access memory), or circuitry forming a communications device (e.g., a modem, communications switch, or optical-electrical equipment).

"Firmware" in this context refers to software logic embodied as processor-executable instructions stored in read-only memories or media.

"Hardware" in this context refers to logic embodied as analog or digital circuitry.

"Logic" in this context refers to machine memory circuits, non transitory machine readable media, and/or circuitry which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter).

"Programmable device" in this context refers to an integrated circuit designed to be configured and/or reconfigured after manufacturing. The term "programmable processor" is another name for a programmable device herein. Programmable devices may include programmable processors, such as field programmable gate arrays (FPGAs), configurable hardware logic (CHL), and/or any other type programmable devices. Configuration of the programmable device is generally specified using a computer code or data such as a hardware description language (HDL), such as for example Verilog, VHDL, or the like. A programmable device may include an array of programmable logic blocks and a hierarchy of reconfigurable interconnects that allow the programmable logic blocks to be coupled to each other according to the descriptions in the HDL code. Each of the programmable logic blocks may be configured to perform complex combinational functions, or merely simple logic gates, such as AND, and XOR logic blocks. In most FPGAs, logic blocks also include memory elements, which may be simple latches, flip-flops, hereinafter also referred to as "flops," or more complex blocks of memory. Depending on the length of the interconnections between different logic blocks, signals may arrive at input terminals of the logic blocks at different times.

"Software" in this context refers to logic implemented as processor-executable instructions in a machine memory (e.g. read/write volatile or nonvolatile memory or media).

References to "one embodiment" or "an embodiment" do not necessarily refer to the same embodiment, although they may. Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively, unless expressly limited to a single one or multiple ones. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list, unless expressly limited to one or the other. Any terms not expressly defined herein have their conventional meaning as commonly understood by those having skill in the relevant art(s).

Referring to FIG. 1, the group of features 100 is depicted in a first simulation field 102 and a second simulation field 104. The location of each of the features in the group of features 100 varies from the first simulation field 102 to the second simulation field 104. Critical dimensions for the features can be determined in each simulation field 102 and 104. A shift variance for each feature can be determined based on the critical dimension for the group of features 100 in the first simulation field 102 and the second simulation field 104.

Using the method described below, the critical dimensions for each feature can be finely sampled across the full simulation field, providing a more accurate measurement for shift variance of each feature. A unit cell including a set of features is replicated and arrayed in two dimensions. The array of replicated unit cells is then broken into templates, each containing multiple unit cells, some of which may be cut off at the edge of the template. Each template is input into a simulation engine, which rigorously simulates optical effects at regular points within a simulation field using on a simulation algorithm. The templates are cut in such a way that the simulation points fall at different locations on the unit cells relative to the features. Thus, the unit cells effectively sample the simulation field when the horizontal and vertical pitch of the unit cells are not a divisor of the width or height of the template plus the separation space. To well sample the simulation field, a mathematical algorithm is used to determine the spacing between the unit cells. The determined spacing maximizes this pitch difference both vertically and horizontal so that the simulation field can be well sampled with the fewest number of unit cells and consequently, fewest critical dimension measurements. In addition, before the unit cells are arrayed and broken up into templates for simulation, optical proximity correction is performed on the input unit cell, using replicas of the unit cell spaced at the spacing determined by the algorithm as context for the unit cell being proximity corrected. Care is taken to place the arrayed unit cells at multiples of the database unit (dbu) to avoid issues like grid snapping. Thus, optical proximity correction is performed on the unit cell in the same environment that the unit cell will have during simulation.

Figure 2:
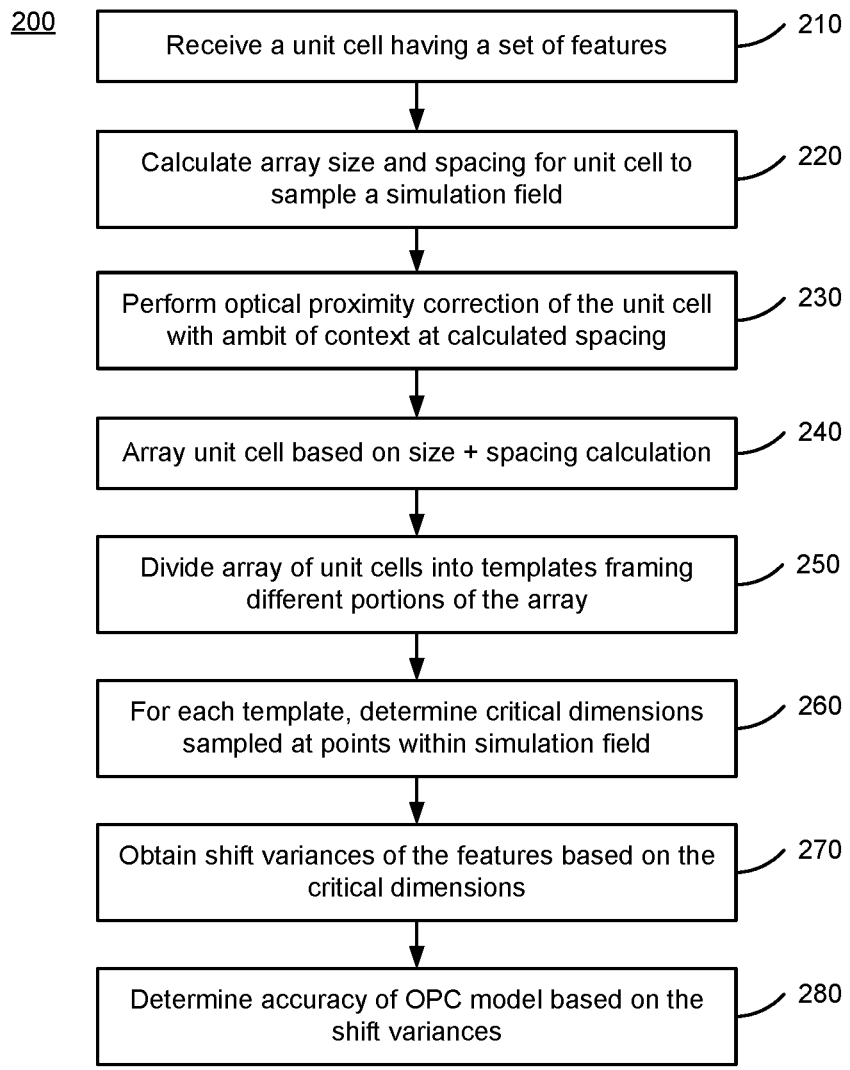
FIG. 2 illustrates an embodiment of a process 200.

FIG. 2 is a flowchart showing a process for determining dimensional changes of features based on simulated shift variances. As discussed herein, the steps of process 200 are performed by an electronic design automation (EDA) tool.

The EDA tool may include, among other components, an optical proximity correction (OPC) tool, a layout tool for generating geometries, and a resolution enhancement (RE) tool.

The EDA tool receives 210 a unit cell having a set of features. The features in the unit cell may be selected as patterns and placed in a group by a designer to test specific geometries, who may be assisted by automated processing, e.g., EDA software. In some embodiments, a plurality of markers are layered on the unit cell; the markers can be used to uniquely identify each of the plurality of features within the unit cell. Some embodiments further involve generating the markers, e.g., by randomly placing coded markers within the unit cell.

The EDA tool calculates 220 an array size and spacing for the received unit cell which will provide good sampling of the simulation field. For example, given a target number of unit cells in the array and a target template size (e.g., the template size the simulation engine is configured to receive as input), the EDA tool can solve for the spacing between unit cells. The unit cells are arrayed vertically and horizontally, and the spacing between unit cells may be the same in the horizontal and vertical direction, or the spacing in each direction may be different. The size of the array will be determined by the size of the unit cell and the determined spacing.

The EDA tool calculates the array size and spacing in order to provide sampling of the simulation field within a targeted measurement density. In some embodiments, the EDA tool uses the following iterative approach in both horizontal and vertical directions: 1. A user specifies a required measurement density in the form of nm/measurement (e.g. 100 nm/measurement); 2. The user provides an initial number of unit cells and a minimum separation distance; 3. The EDA tool calculates the centers of the unit cells with the number and spacing; 4. The placement of the center of each unit cell in the simulation field will be roughly the remainder of the calculated centers and the dimension of the simulation field that can fit in this distance. In the horizontal direction, the placements of the ith centers of the unit cells is: modulus($i_{unitcell}$*($UC_{Width}$+$UC_{Spacex}$), $Template_{width}$). The placements of the ith centers of the unit cells is similarly calculated for the vertical direction. The distribution of these centers can be found by calculating the population of a histogram with resolution the required measurement density. If there are any 0 population bins, then the algorithm increments and/or adds more target cells until the required target measurement density has at least one measurement in each bin. Features not at the center of the unit cell will be displaced from the original calculation but their density in the simulation field will be unchanged. Other effects like overlapping neighboring simulating may affect the actual sampling density but the above approach provides a reasonable algorithm for obtaining horizontal and vertical target cells numbers and spacings to achieve a targeted sampling density. The algorithm for calculating the spacing is further described with respect to FIG. 8.

Once the spacing is calculated, the EDA tool performs 230 optical proximity correction (OPC) on the unit cell with an ambit of context at the calculated spacing. Before performing the OPC, the unit cell (referred to as a "target unit cell") is prepared for the OPC by being surrounded by an odd number of replicas of the unit cell positioned relative to each other at the determined unit cell horizontal spacing and vertical spacing. The number of unit cells surrounding the target unit cell is based on the ambit distance, which is the maximum proximity distance at which neighboring geometries affect a simulation result. For example, if an ambit is two unit cells, the target unit cell may be surrounded by a border of replica cells that is two unit cells wide, thus forming a 5×5 grid of unit cells. In some embodiments, the number of unit cells used to form the ambit in the height direction may be different from the number of unit cells in the width direction, e.g., a 3×5 grid may be used. After surrounding the target unit cell by the ambit, optical proximity correction is performed on the target unit cell. A process for performing the optical proximity correction with the ambit of context is illustrated visually in FIGS. 3-5.

Figure 6:
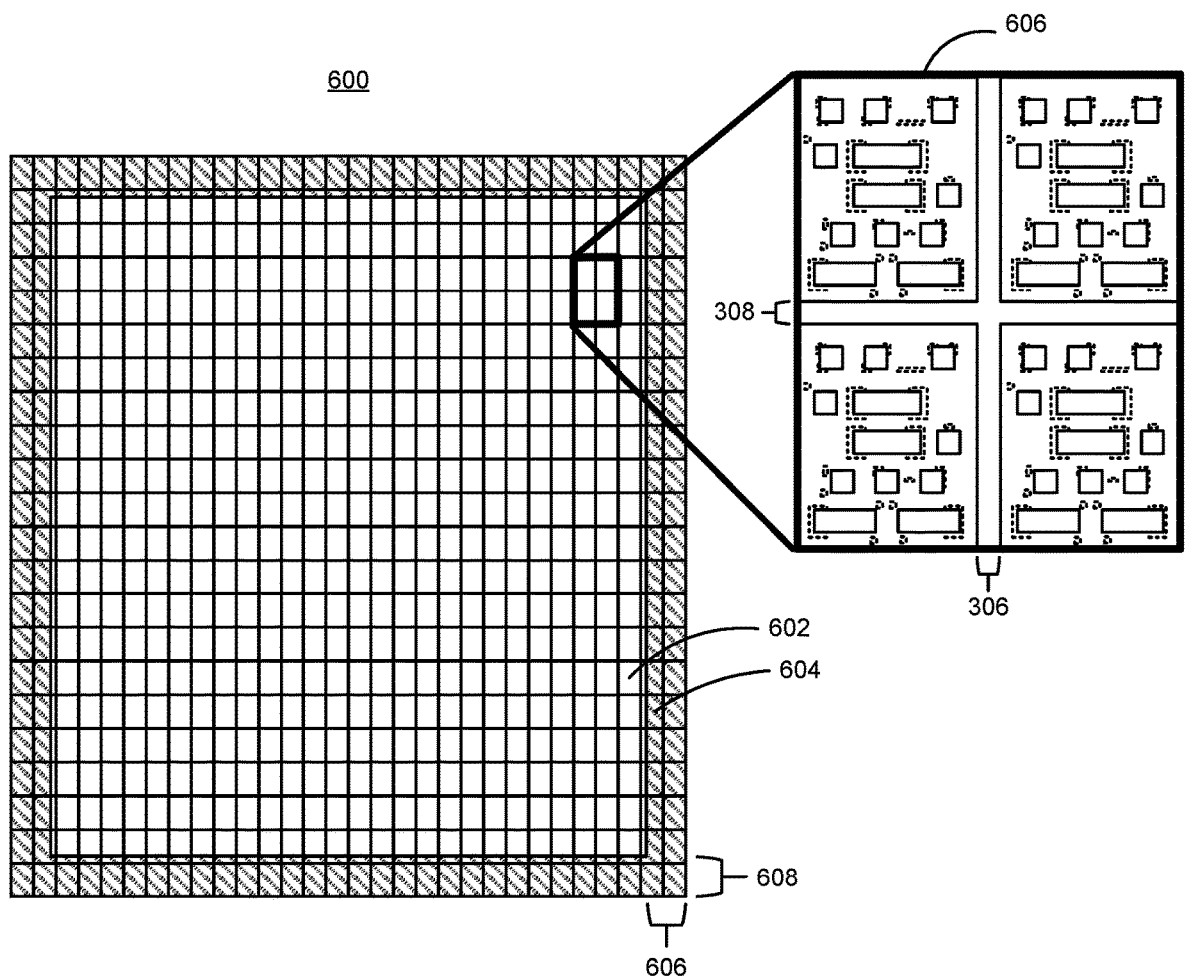
FIG. 6 illustrates an array of unit cells in accordance with one embodiment.

The EDA tool arrays 240 the proximity corrected unit cell by replicating the proximity corrected unit cell and arranging the proximity corrected unit cells in a two-dimensional grid. The spacing between the unit cells in the array is based on the previously calculated horizontal spacing and vertical spacing, and the size of the array is based on the previously calculated array size. Each unit cell, as a replica of the proximity corrected unit cell, includes the same plurality of features. The replicated unit cells are separated from adjacent unit cells by a separation distance, which is the spacing calculating calculated at 220. The separation distance may be less than an ambit distance. The separation distance may be shorter than an edge length of the unit cell. In some embodiments, the spacing in one direction (e.g., the horizontal direction) is different from the spacing in the other direction (e.g., the vertical direction). An example of an array of unit cells is shown in FIG. 6.

The EDA tool divides 250 the array of unit cells into templates, each of which frames a different portion of the array. An ambit around the edge of the array is covered by a marking layer so that patterns close to the edge of the array are excluded from any subsequent measurements. The ambit merely provides environmental information. Regions that are not covered by this marking layer have sufficient context to produce accurate critical dimension measurements. The unit cells had been spaced at 240 such that the locations of the portion of the unit cells within each template frame are shifted with respect to the locations of the other portions of the unit cells within other template frames owing to the pitch mismatch described earlier. As an example, in a first template, a first portion of unit cells may include a top-left unit cell that is aligned perfectly with the frame of the first template, while in a second template, a second portion of unit cells include a full top-left unit cell (i.e., the leftmost and uppermost unit cell that is not cut off by the template) that is aligned with the top of the frame of the second template, but is offset a half-unit cell from the left edge of the template. In some embodiments, the locations of the unit cells framed by a first template are shifted in both a horizontal direction and a vertical direction relative to the locations of the unit cells framed by a second template. By moving the relative locations of the unit cells within the templates, the unit cells (and the features of the unit cells) effectively sample a simulation field with the exception of a 1 ambit border applied to each template, which is used for context for the remaining of the simulation field, which is sampled. In this case, the spacing in the horizontal and vertical directions between unit cells is less than one ambit. In order to sample the location dictated by the 1 ambit border, the user can increase the field size (e.g., from 1024×1024 to 2048×2048) or increase the field size sampling distance. Step 240 creates a layout composed of corrected unit cells arrayed over large area; when the layout is divided into templates at 250, the position of each feature relative to the simulation field may be unique, while the identical features have exactly the same context wherever they are placed in the simulation field.

Figure 7:
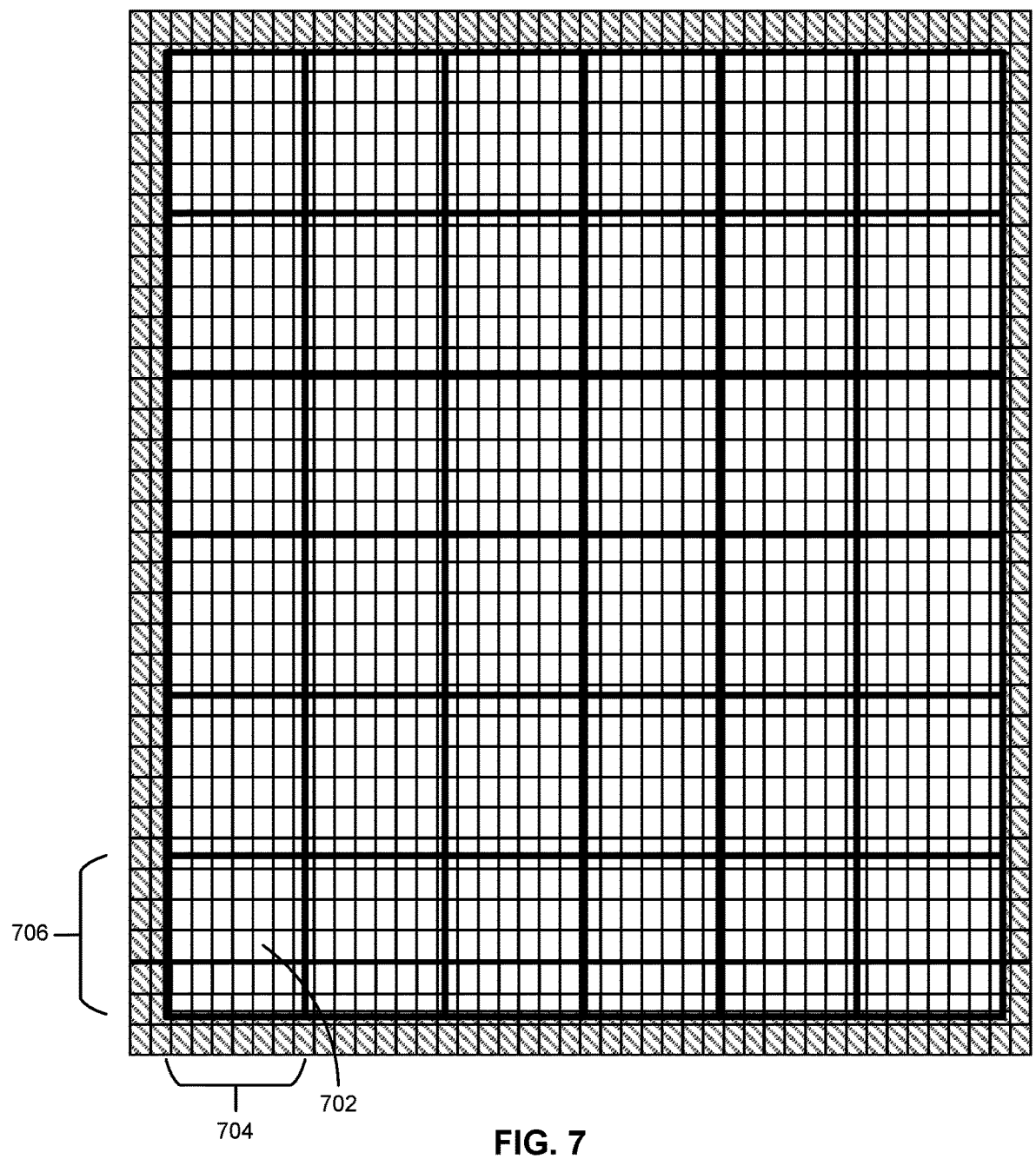
FIG. 7 illustrates a division of the array of unit cells into templates in accordance with one embodiment.

Each of the templates may be used to simulate implementations of the plurality of features in each unit cell on a simulation field. The simulation field overlays a set of sampling or measurement points, e.g., 1024×1024 points, or 2048×2048 points on each template. Each of the templates may be simulated independently from the other templates. Each template of the plurality of templates may have a length in a direction (e.g., a horizontal and/or vertical direction) that is different from any integer multiple of a sum of (i) a length of the unit cell in the direction, and (ii) the separation distance. Unit cells in each template are arrayed at the same horizontal spacing and vertical spacing but because of mismatch in pitch different templates have their unit cells placed differently from template to template. An example of dividing the cells into templates is shown in FIG. 7.

For each of the templates, the EDA tool determines 260 the critical dimensions of features sampled at a set of points on the simulation field. Each of the critical dimensions represents a size of a simulated implementation of the feature measured at the corresponding point on the simulation field. Determining the critical dimensions may involve independently simulating each of the templates using a simulation algorithm, and measuring critical dimensions at the set of points within each simulation field. The critical dimensions are determined from field-based algorithms that use inputs from the sampled intensity field to calculate critical dimensions anywhere in the field.

The EDA tool obtains 270 shift variances of the features based at least in part on the critical dimensions. The EDA tool may group different features in the unit cell based on the markers described above, and determine the change in critical dimension (i.e., the shift variance) for each feature even if the feature has proximity to other features. In some embodiments, the EDA tool determines a shift variance for each gauge, which is a measurement of a feature (e.g., the width or length of a particular feature). Each of the shift variances may represent a variance of the critical dimensions associated with replicas of a corresponding feature of the plurality of features in the shifted locations on the simulation field.

The EDA tool determines 280 whether a model used for optical proximity correction is sufficiently accurate based on the shift variances. If the shift variances for all of the features is sufficiently small, this indicates that the model does not introduce incorrect optical proximity corrections, misses sites during validation, or flags false errors. On the other hand, if the shift variances for one or more features are large, this can cause the model to introduce errors, which negatively impact the manufacturability of semiconductor designs output by the EDA tool. In some embodiments, the shift variance is used to test rasterization or other modeling component needed to simulated critical dimensions. In other embodiments, the shift variance is used to test the simulation algorithm used by the simulation engine to calculate the critical dimensions. In some embodiments, the EDA tool compares the shift variances to a selected or predetermined threshold. For example, the EDA tool may compare each determined shift variance (i.e., for each feature or gauge) to a threshold and evaluate the number of shift variances that are above or below the threshold. Alternatively, the EDA tool may compare one or more statistics describing the shift variances (e.g., mean, maximum, minimum, median, standard deviation, etc.) to one or more corresponding thresholds and determine whether the shift variance statistic is above or below the corresponding threshold.

This approach yields benefits including:

1. It is easily distributed over multiple simulators because conventional OPC tools already divide masks into templates and distribute processing across the templates. This allows parallel processing of the simulations and determining of critical dimensions within each simulation field.

2. It enables dense sampling because the replicas of the unit cell are repeated across each template.

3. It may be applied to any environment and any target unit cell because the proximity-corrected unit cell is created for a particular environment and target cell.

4. Shift variance for multiple, possibly interacting features may be calculated.

5. It is easy to generate the test layout because an algorithm indicates the spacing and number of unit cells to use, and the layout is a simple array of the optical proximity corrected unit cell.

The goal of process 200 is to create and analyze a uniform array of unit cells whose mask and target patterns are replicated across a large field. The unit cell patterns may be snapped to the chosen database unit (DBU), which determine the coordinate system for the cell, features, and mask. For example, the DBU unit may be determined as a multiple of the simulation grid to avoid snapping errors or interpolation inside the simulation logic. For example, the DBU may be $2*\frac{1}{16}$ nm=0.125.

Figure 3:
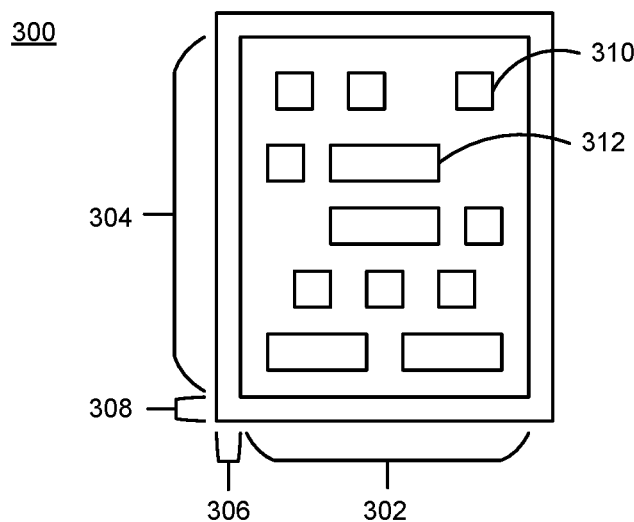
FIG. 3 illustrates a target unit cell 300 in accordance with one embodiment.

FIG. 3 shows an example of a target unit cell 300, which comprises a unit cell width 302, a unit cell height 304, a horizontal unit cell spacing 306, a vertical unit cell spacing 308, a first unit cell feature 310, and a second unit cell feature 312.

The unit cell width 302 and the unit cell height 304 comprise an area that includes unit cell features, such as the first unit cell feature 310 and the second unit cell feature 312.

Figure 8:
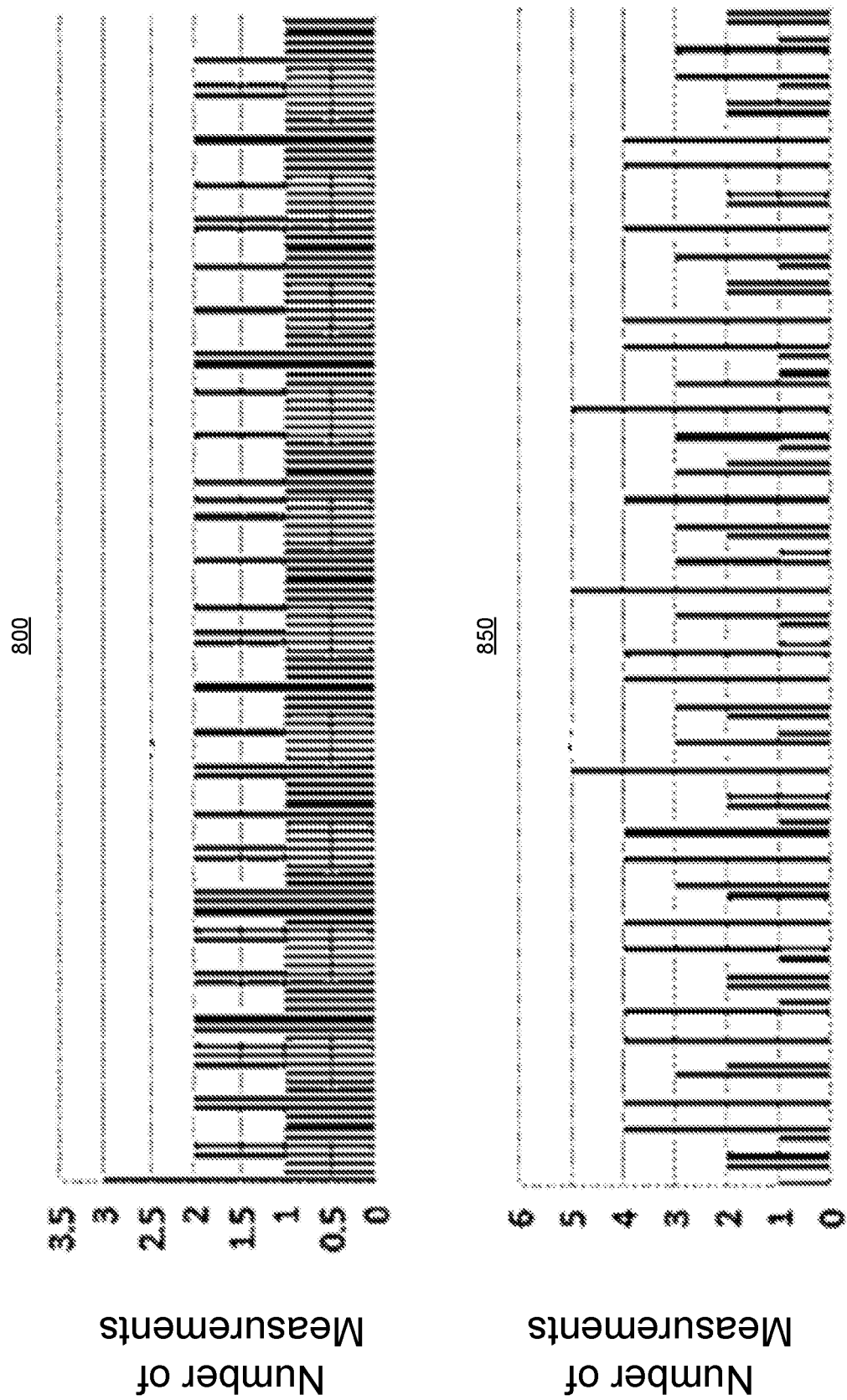
FIG. 8 illustrates two histograms in accordance with one embodiment.

The horizontal unit cell spacing 306 and the vertical unit cell spacing 308 provide spacing between multiple unit cells when arrayed. The horizontal unit cell spacing 306 and the vertical unit cell spacing 308 may be altered to change the spacing between the unit cells within an array, e.g., within a simulation field or within multiple templates each having a simulation field. As discussed above in relation to step 220, the horizontal unit cell spacing 306 and vertical unit cell spacing 308 may be calculated to sample the simulation field. An exemplary algorithm for calculating the spacings 306 and 308 are described with respect to FIG. 8. FIG. 8 includes a first histogram 800 showing an exemplary result in which all bins for a required sampling density in one direction are populated, and a second histogram 850 showing an exemplary result in another direction with many unoccupied bins, which indicates that the spacing or number of unit cells has not achieved the required sampling density. The effect is that more iteration is required to find a spacing or number of unit cells to reach the required simulation field sampling density for the direction represented by histogram 850.

The first unit cell feature 310 and the second unit cell feature 312 are exemplary features within the target unit cell 300. Each may have different location within the target unit cell 300 and may have a different or similar geometric shape. As described above, the process 200 determines shift variances for features such as unit cell features 310 and 312 across a simulation field.

Part of the process of determining shift variances may involve creating mask layers (e.g., main, inriggers and outriggers) utilizing proximity correction logic such as Synopsys Proteus. The proximity correction is applied such that that the target unit cell is surrounded by other target unit cells comprising at least an ambit distance. An example of this is shown in FIG. 4.

Figure 4:
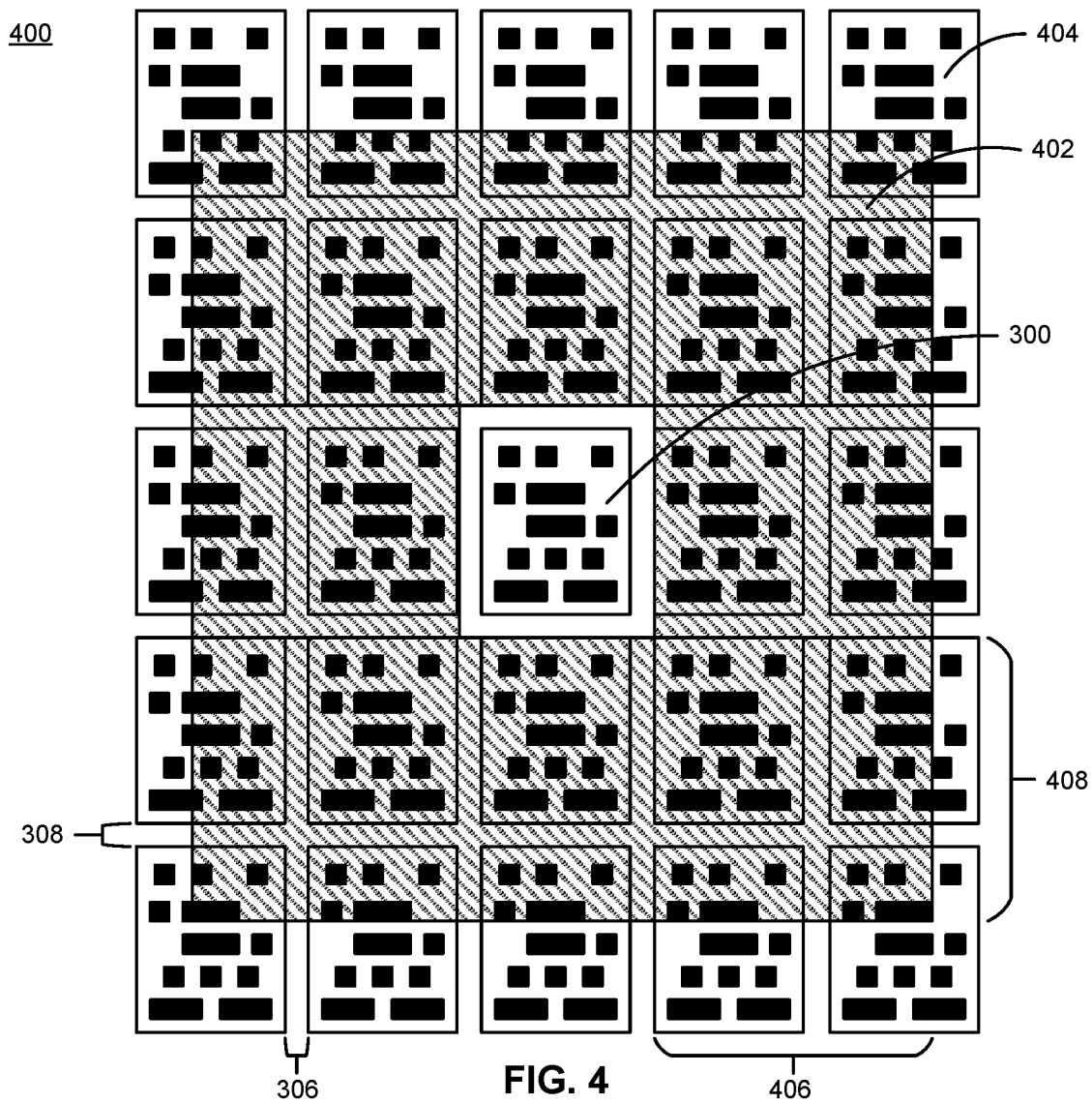
FIG. 4 illustrates an odd array of target unit cells 400 in accordance with one embodiment.

FIG. 4 shows an odd array of target unit cells 400 that include a target unit cell 300 and an odd number of replica unit cells surrounding the target unit cell 300.

The target unit cell 300, i.e., the centermost unit cell in the array 400, shows the target unit cell 300 prior to proximity correction. As depicted in FIG. 4, the center unit cell is surrounded by a border of replicas of the unit cells, such as replica unit cell 404. The border of replicas is two unit cells wide. An ambit width 406 and ambit height 408, which are shown as the shaded ambit region 402, shows the ambit around the target unit cell 300. In both the horizontal and vertical direction, the ambit distance may be 1 or more unit cells in each of the directions; as depicted, the ambit region width 406 and ambit height 408 are both between one and two unit cells from the target unit cell 300. Thus, the target unit cell 300 is surrounded by at least an ambit of context (left, right, top and bottom) so that all feature within the center unit cell have sufficient context to generate optical proximity correction as if the center unit were within a large array. All of the unit cells in the odd array of unit cells are separated from neighboring unit cells in the horizontal direction by a horizontal unit cell spacing 306, and from neighboring unit cells in the vertical direction and the vertical unit cell spacing 308. These are the same spacings that will be used when the target unit cell is arrayed and divided into templates.

Proximity correction is applied to the target unit cell 300 and is determined based on the influence of the unit cells in the surrounding ambit region 402. The features within the ambit region 402 provide environmental context used to correct the target unit cell 300. Once proximity correction is applied to the target unit cell 300 and the ambit region 402, the target unit cell 300 may be referred to as a corrected target unit cell 300 with a mask pattern.

Figure 5:
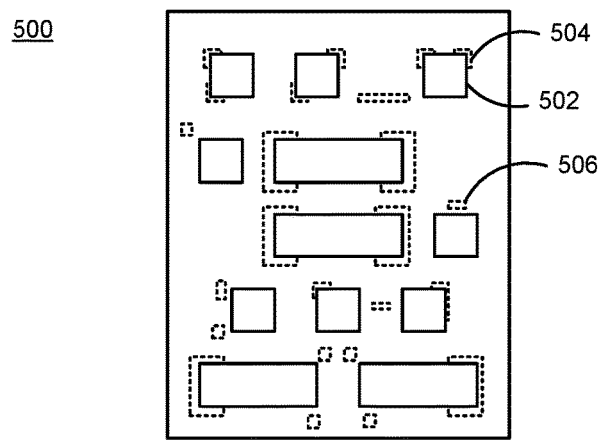
FIG. 5 illustrates a proximity corrected unit cell in accordance with one embodiment.

FIG. 5 shows an example of a proximity corrected unit cell 500. The proximity corrected unit cell 500 includes the same set of features as target unit cell 300; for example, feature 502 corresponds to feature 310 shown in FIG. 3. The proximity corrected unit cell 500 may also include assist features, or proximity correction features, such as 504 and 506, which are included to compensate for lithography errors, e.g., due to diffraction or process effects.

After proximity correction, the corrected unit cell 500 is copied and the replicas are arrayed over a larger grid. The placements are on the grid are made at the same separation distances used during the optical proximity correction, i.e., the horizontal unit cell spacing 306 and vertical unit cell spacing 308 shown in FIG. 3. The number of unit cell in both the horizontal and vertical distance were pre-calculated (e.g., at step 210 of FIG. 2) based on achieving target sampling with the fewest number of unit cells. An exclusion zone of at least one ambit is also created at the border of the array. Critical dimension measurements are not performed for geometries under the exclusion zone. Instead, the exclusion zone provides a one ambit context so that all features outside of the exclusion zone have at least one ambit of context.

An example of an array of unit cells is shown in FIG. 6. FIG. 6 shows an array of unit cells 600, which includes many proximity corrected unit cells 602 and an exclusion zone 604, which is also made up of proximity corrected unit cells. The exclusion zone 604 has an ambit width 606 and an ambit height 608 where each is greater than or equal to 1 ambit width. The exclusion zone 604 provides context for the unit cells to be simulated. The unit cells in the exclusion zone 604 are shaded to distinguish them from the unit cells 602 to be analyzed. As pictured, the exclusion zone 604 only includes the unit cells and portions of unit cells that extend to the edge of the ambit distance; thus, the second row of unit cells away from the outer edge is cut off partway in both the horizontal and vertical directions. Further, as depicted in FIG. 6, the ambit height 608 and the ambit width 606 are of equal length. In some embodiments, the exclusion zone 604 may be larger than the ambit.

FIG. 6 also shows a zoomed-in set of four unit cells 606 in the array 600. The zoomed-in set of unit cells 606 shows that the unit cells 602 are identical to the proximity corrected unit cell shown in FIG. 5. The proximity corrected unit cell 500 was arrayed to form the array 600. In addition, the zoomed-in set of unit cells 606 shows that the unit cells 602 are separated by the horizontal unit cell spacing 306 and the vertical unit cell spacing 308 shown in FIG. 3.

The array 600 is divided into templates, which are used by the simulation engine, running a simulation algorithm, to simulate the critical dimensions of features within a simulation field that is applied to each template. If a length of the unit cells in a particular direction is not an integer multiplier of the length of the template in the same direction, then the unit cells effectively are moved around the simulation field since the simulation field is generally centered on the template. For shift variance testing, the mismatch of lengths may be set between n*(unit_cell_length+spacing) and the size of the graphics that populate the simulation field, so that the simulation field is adequately sampled by determining thru the iterative process, described with respect to step 220 of FIG. 2 and described further below with respect to FIG. 8, a number of unit cells and a horizontal spacing and vertical spacing that achieve a target sampling density of the simulation field.

FIG. 7 shows an example of an array 700 divided into templates. Following the example shown in the prior figure, the array 700 is the array of unit cells 600 after being divided into templates. The thinner lines show the boundaries of the unit cells, and the thicker lines show the boundaries of the templates. For example, template 702 is positioned at the lower-left corner of the array 700. As noted above, the unit cells in the exclusion zone are not included in the templates, and merely serve as context to the unit cells within the templates. Two side lengths of template 702 are shown in FIG. 7: template width 704 and a template height 706. In this example, the template height 706 is slightly longer than five unit cells, and the template width 704 is slightly longer than seven unit cells. In some embodiments, the template height 706 and the template width 704 are the same size. In other embodiments, the template height 706 and the template width 704 are of different sizes. If, in another example, the template height were an integer number of unit cells, while the template width were not an integer number of unit cells, the geometric features within the unit cell would be better sampled in the horizontal direction than in the vertical direction.

Parameters that effect sampling in both the horizontal and vertical directions include: 1. Number of unit cells; 2. Width and height of the unit cell; 3. Horizontal and vertical spacing between unit cells; and 4. Graphics size.

An algorithm may be applied to predict the sampling density. In general, a user of the EDA tool can easily vary the spacing between the unit cell and the number of unit cells in the array 700 to improve and/or optimize simulation field sampling. The algorithm may be used to set the spacing and the number of unit cells to generate the layout.

After the array 700 is divided into templates, the critical dimensions of features in the unit cell are measured for each template, and the critical dimensions of each feature at different locations within the simulation field are recorded and analyzed. To tabulate critical dimensions for each feature, the EDA tool may identify the same feature over the entire layout independent of where the unit cell is placed, e.g., using markers that can be used to uniquely identify each feature. In one embodiment, identifying the features is accomplished using pattern matching so that each feature in the unit cell is uniquely identified. EDA tools such as Proteus LRC may be customized for this task.

The EDA tool can output the determined critical dimensions or shift variance for a distinct feature or gauge. For example, the EDA tool can provide a color plot for a feature, with the x axis corresponding to the x axis of the simulation field, the y axis corresponding to the y axis of the simulation field, and the color at each point within the plot corresponding to the critical dimension of the feature at that point. The color plot visually shows the variation in critical dimension at different points across the simulation field. As another example, the EDA tool can provide a box plot showing the variation in the determined critical dimensions for a feature. A box plot would typically show the range in critical dimensions as well as the median and the upper and lower quartiles of the critical dimension measurements for the feature. The EDA tool may provide other types of outputs, e.g., raw data, data summaries, visual summaries, etc., which may be useful to a designer or user preparing the OPC models. Conversely, if the shift variance is large as a percentage of target critical dimension, developers of the simulation algorithm and/or components may analyze and determine source of the large shift variance.

The method described above can be extended to characterize the effect of orientation on shift variance in two manners:

1. Create arrays of unit cells after proximity correction at different rotations. Each array is isolated from the others. The analysis may be used to characterize the effects of symmetry.

2. Create corrected unit cells at different orientations to remove the effect of model asymmetry on the correction itself. Each corrected unit cell is arrayed similar to the arraying shown in FIG. 6, but with unit cells at another orientation and isolated from arrays at any other orientation by at least an ambit. The analysis provides the effect of rotation on shift variance for the features in the unit cell when compared shift variance at any other rotation for the same features.

The sampling density of the final layout may be visualized by plotting location of each feature versus field position. An example of two sampling densities are shown in FIG. 8. The coverage of the simulation field may be calculated by comparing the pitch of unit cell placements (i.e., the height and width between the same points on adjacent unit cells), the number of the unit cells, and the size of the graphics in the simulation field. To determine the size of the array and spacing of the unit cells (e.g., at step 220 in process 200), it is assumed that $N_{UnitCellsx}$ will be arrayed in the horizontal direction with vertical pitch $UC_{Height}+UC_{Spacey}$ and horizontal pitch $UC_{Width}+UC_{Spacex}$. It is further assumed that the templates divided out of the array will have height $Template_{height}$ and width $Template_{width}$. The relative locations of the centers of the unit cells in the horizontal direction is:

$$Field_x = \text{modulus}(i_{unitcell}*(UC_{Width}+UC_{Spacex}), Template_{width})$$

The relative locations of the centers of the unit cells in the vertical direction is:

$$Field_y = \text{modulus}(i_{unitcell}*(UC_{Height}+UC_{Spacey}), Template_{height})$$

where modulus is a conventional function for determining the remainder, $i_{unitcell}$ ranges from 1 to $N_{unitcellsx}$ and $N_{unitcellsy}$ are for the horizontal and vertical directions, respectively. If, for example, the template sizes, unit cell height and width, and relative locations of the field centers are pre-set or provided by a designer, the above equations can be solved to determine the populations of sampling with the input of horizontal and vertical spacing.

The predicted distribution given a particular set of sizing and spacing parameters can be plotted by calculating $Field_x$ and $Field_y$ and plotting as a histogram. Referring to FIG. 8, the histogram 800 shows coverage of a simulation field in a horizontal direction, and histogram 850 shows coverage of a simulation field in a vertical. This histograms 800 and 850 describes coverage for an example that is different from the example shown in FIGS. 3-7. In the example plotted in FIG. 8, the template height is an integer number of unit cells, while the template width is not an integer number of unit cells; in this example, the geometric features within the unit cell are better sampled in the horizontal direction than in the vertical direction.

The histogram 800 predicts the location of the center of unit cell in a simulation field in the horizontal direction via the simulation field horizontal direction coverage, and the histogram 850 predicts the location of the center of unit cell in a simulation field in the vertical direction via the simulation field vertical direction coverage. As depicted in histogram 850, the simulation field vertical direction coverage is poor. Both the simulation field horizontal direction coverage shown in histogram 800 and the simulation field vertical direction coverage shown in histogram 850 may be altered by changing parameters, such as the number of unit cells, the width and height of the unit cell, the horizontal and vertical spacing between unit cells, and the graphics size.

The above method can be automated by iterating over the combination of horizontal, vertical, and number of unit cells in each direction that achieves a required sampling density in both directions.

Figure 9:
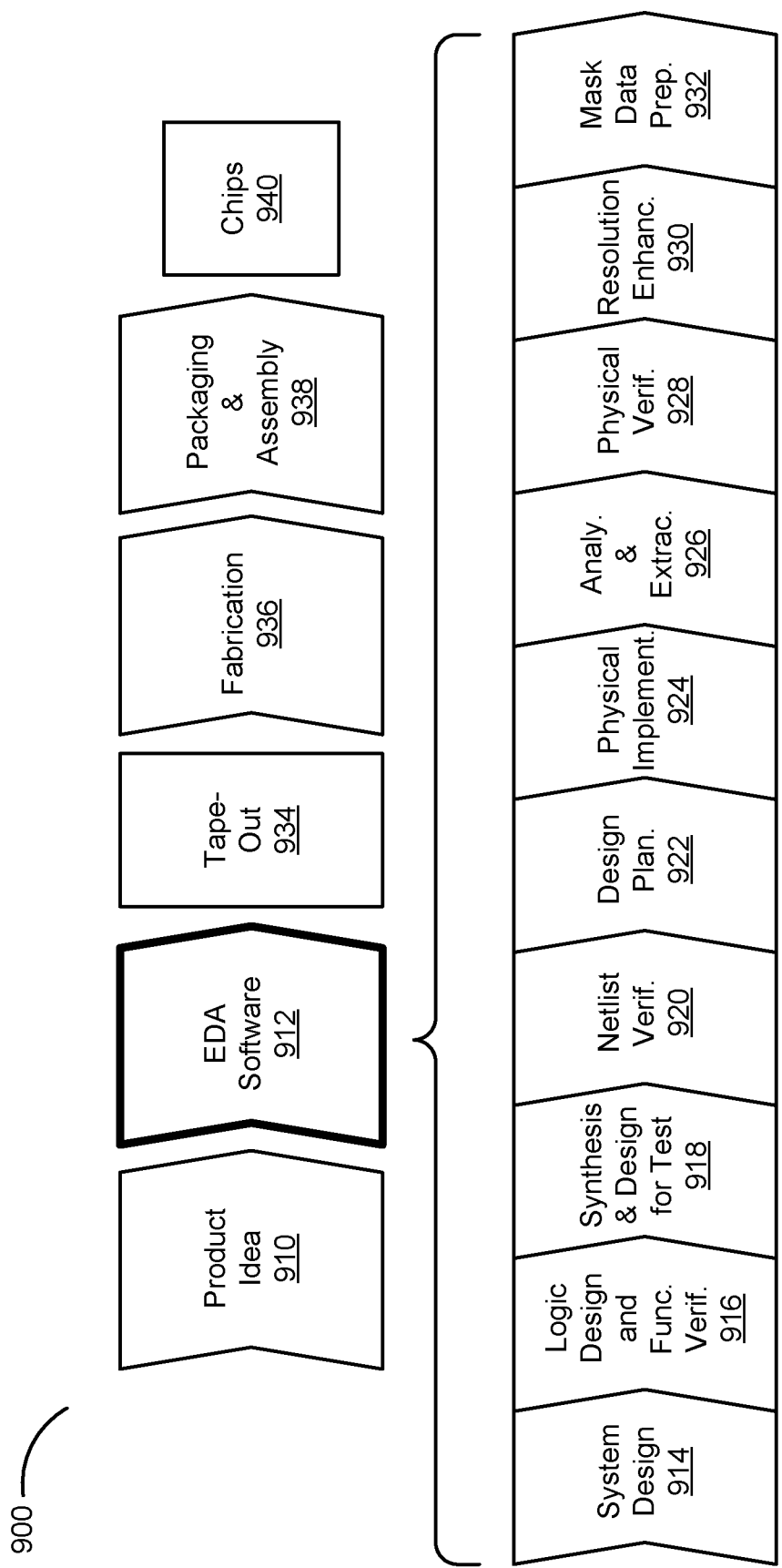
FIG. 9 is a flowchart illustrating the various operations in the design and fabrication of an integrated circuit in accordance with one embodiment

FIG. 9 is a flowchart 900 illustrating the various operations in the design and fabrication of an integrated circuit. This process starts with the generation of a product idea 910, which is realized during a design process that uses electronic design automation (EDA) software 912. When the design is finalized, it can be taped-out 934. After tape-out, a semiconductor die is fabricated 936 to form the various objects (e.g., a bitcell including gates, metal layers, vias) in the integrated circuit design. Packaging and assembly processes 938 are performed, which result in finished chips 940.

The EDA software 912 may be implemented in one or more computing devices including a memory. An example of a memory is a non-transitory computer readable storage medium. For example, the EDA software 912 is stored as instructions in the computer-readable storage medium which are executed by a processor for performing operations 914-932 of the design flow, which are described below. This design flow description is for illustration purposes. In particular, this description is not meant to limit the present disclosure. For example, an actual integrated circuit design may require a designer to perform the design operations in a difference sequence than the sequence described herein.

A cell library incorporating one or more unit cells as described above with reference to FIGS. 1 through 9 may be stored in the memory. The cell library may be referenced by the EDA software 912 to create a circuit or electronic device incorporating the unit cell.

During system design 914, designers describe the functionality to implement. They can also perform what-if planning to refine the functionality and to check costs. Note that hardware-software architecture partitioning can occur at this stage. During logic design and functional verification 916, VHDL or Verilog code for modules in the circuit is written and the design is checked for functional accuracy. More specifically, the design is checked to ensure that it produces the correct outputs. During synthesis and design for test 918, VHDL/Verilog is translated to a netlist. This netlist can be optimized for the target technology. Additionally, tests can be designed and implemented to check the finished chips. During netlist verification 920, the netlist is checked for compliance with timing constraints and for correspondence with the VHDL/Verilog source code.

During design planning 922, an overall floor plan for the chip is constructed and analyzed for timing and top-level routing. Example EDA software products from Synopsys, Inc. of Mountain View, Calif. that can be used at this stage include: Astro® and IC Compiler® products. During physical implementation 924, the placement (positioning of circuit elements) and routing (connection of the same) occurs. During analysis and extraction 926, the circuit function is verified at a transistor level, which permits refinement. During physical verification 928, the design is checked to ensure correctness for: manufacturing, electrical issues, lithographic issues, and circuitry. During resolution enhancement 930, geometric manipulations of the layout are performed to improve manufacturability of the design. During mask-data preparation 932, the 'tape-out' data for production of masks to produce finished chips is provided.

Embodiments of the present disclosure can be used to test the models used in one or more of the above-described stages. Specifically, in some embodiments the EDA tool described in the present disclosure can be used to verify the models in the EDA software 912, and in particular, used for verifying the models used for physical verification 928 and/or resolution enhancement 930, e.g., the models used for OPC. The process described herein is used to test whether the models used will accurately predict real-world behavior during semiconductor fabrication. If the shift variances are sufficiently low, the tested models can be safely used in the mask design process; if the shift variances are too high, the tested models cannot be safely relied upon for use in the mask design process, and should be adjusted.

Figure 10:
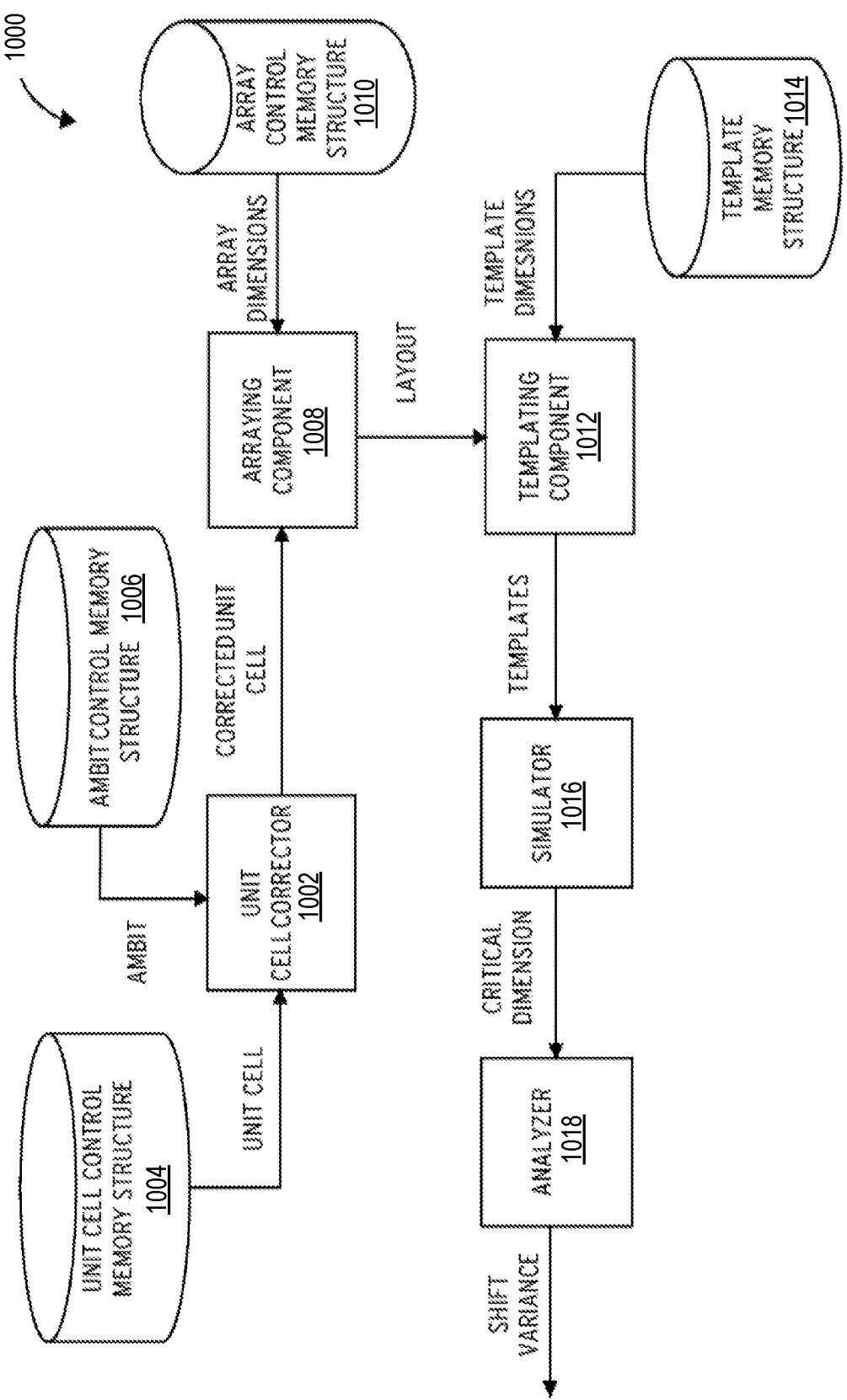
FIG. 10 illustrates an embodiment of an EDA tool.

Referring to FIG. 10, a system 1000 implementing the EDA tool comprises a unit cell corrector 1002, a unit cell control memory structure 1004, an ambit control memory structure 1006, an arraying component 1008, an array control memory structure 1010, a templating component 1012, a template memory structure 1014, a simulator 1016, and an analyzer 1018.

The unit cell corrector 1002 (e.g., an optical proximity corrector) may receive a unit cell from the unit cell control memory structure 1004 and receive an ambit, or instructions for generating an ambit, from the ambit control memory structure 1006. The unit cell corrector 1002 then proximity corrects the unit cell and send the corrected unit cell to the arraying component 1008.

The unit cell control memory structure 1004 may store one or more unit cell and send a unit cell to the unit cell corrector 1002. The ambit control memory structure 1006 may store one or more ambit, or instructions for generating an ambit, and send the ambit or instructions to the unit cell corrector 1002.

The arraying component 1008 may receive the corrected unit cell from the unit cell corrector 1002 and array dimensions from the array control memory structure 1010. The arraying component 1008 may then generate a layout and send to the templating component 1012.

The array control memory structure 1010 may store one of more array dimensions and send an array dimension to the arraying component 1008.

The templating component 1012 may receive a layout from the arraying component 1008 and template dimensions from the template memory structure 1014. The templating component 1012 may divide the layout into a set of templates utilizing the template dimension.

The template memory structure 1014 stores one or more template dimensions and sends a template dimension to the templating component 1012.

The simulator 1016 may receive the templates from the templating component 1012 and generate the critical dimensions within a simulation field for each template. The simulator 1016 sends the critical dimensions to the analyzer 1018.

The analyzer 1018 receives the critical dimensions from the simulator 1016 and generates a shift variance based on the critical dimension.

Figure 11:
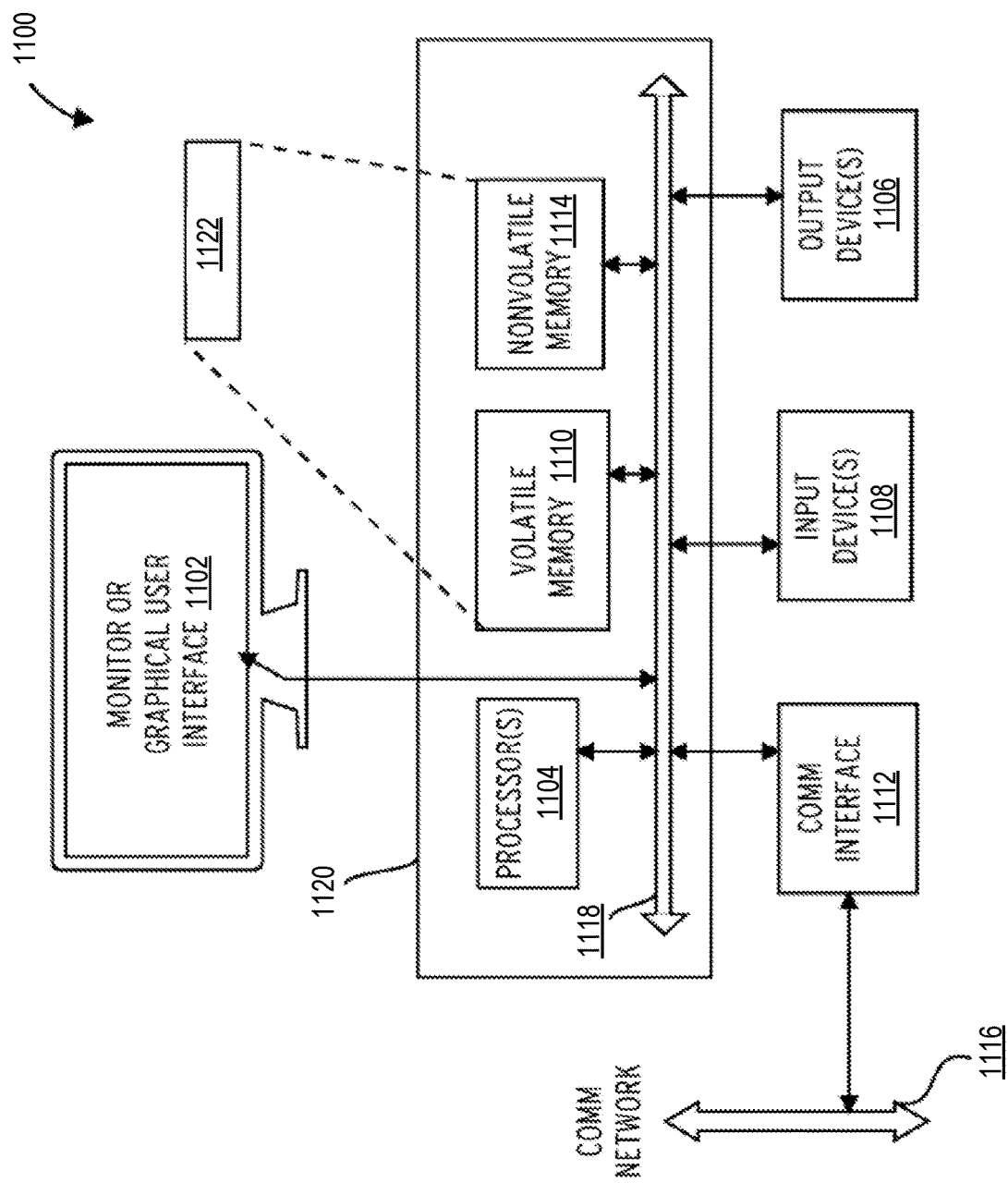
FIG. 11 is an example block diagram of a computing device 1100 that may incorporate embodiments of the present invention.

FIG. 11 is an example block diagram of a computing device 1100 that may incorporate embodiments of the present invention. FIG. 11 is merely illustrative of a machine system to carry out aspects of the technical processes described herein, and does not limit the scope of the claims. One of ordinary skill in the art would recognize other variations, modifications, and alternatives. In one embodiment, the computing device 1100 typically includes a monitor or graphical user interface 1102, a data processing system 1120, a communication network interface 1112, input device(s) 1108, output device(s) 1106, and the like.

As depicted in FIG. 11, the data processing system 1120 may include one or more processor(s) 1104 that communicate with a number of peripheral devices via a bus subsystem 1118. These peripheral devices may include input device(s) 1108, output device(s) 1106, communication network interface 1112, and a storage subsystem, such as a volatile memory 1110 and a nonvolatile memory 1114.

The volatile memory 1110 and/or the nonvolatile memory 1114 may store computer-executable instructions and thus forming logic 1122 that when applied to and executed by the processor(s) 1104 implement embodiments of the processes disclosed herein.

The input device(s) 1108 include devices and mechanisms for inputting information to the data processing system 1120. These may include a keyboard, a keypad, a touch screen incorporated into the monitor or graphical user interface 1102, audio input devices such as voice recognition systems, microphones, and other types of input devices. In various embodiments, the input device(s) 1108 may be embodied as a computer mouse, a trackball, a track pad, a joystick, wireless remote, drawing tablet, voice command system, eye tracking system, and the like. The input device(s) 1108 typically allow a user to select objects, icons, control areas, text and the like that appear on the monitor or graphical user interface 1102 via a command such as a click of a button or the like.

The output device(s) 1106 include devices and mechanisms for outputting information from the data processing system 1120. These may include speakers, printers, infrared LEDs, and so on as well understood in the art.

The communication network interface 1112 provides an interface to communication networks (e.g., communication network 1116) and devices external to the data processing system 1120. The communication network interface 1112 may serve as an interface for receiving data from and transmitting data to other systems. Embodiments of the communication network interface 1112 may include an Ethernet interface, a modem (telephone, satellite, cable, ISDN), (asynchronous) digital subscriber line (DSL), FireWire, USB, a wireless communication interface such as BlueTooth or WiFi, a near field communication wireless interface, a cellular interface, and the like.

The communication network interface 1112 may be coupled to the communication network 1116 via an antenna, a cable, or the like. In some embodiments, the communication network interface 1112 may be physically integrated on a circuit board of the data processing system 1120, or in some cases may be implemented in software or firmware, such as "soft modems", or the like.

The computing device 1100 may include logic that enables communications over a network using protocols such as HTTP, TCP/IP, RTP/RTSP, IPX, UDP and the like.

The volatile memory 1110 and the nonvolatile memory 1114 are examples of tangible media configured to store computer readable data and instructions to implement various embodiments of the processes described herein. Other types of tangible media include removable memory (e.g., pluggable USB memory devices, mobile device SIM cards), optical storage media such as CD-ROMs, DVDs, semiconductor memories such as flash memories, non-transitory read-only-memories (ROMS), battery-backed volatile memories, networked storage devices, and the like. The volatile memory 1110 and the nonvolatile memory 1114 may be configured to store the basic programming and data constructs that provide the functionality of the disclosed processes and other embodiments thereof that fall within the scope of the present invention.

Software that implements embodiments of the present invention may be stored in the volatile memory 1110 and/or the nonvolatile memory 1114. Said software may be read from the volatile memory 1110 and/or nonvolatile memory 1114 and executed by the processor(s) 1104. The volatile memory 1110 and the nonvolatile memory 1114 may also provide a repository for storing data used by the software.

The volatile memory 1110 and the nonvolatile memory 1114 may include a number of memories including a main random access memory (RAM) for storage of instructions and data during program execution and a read only memory (ROM) in which read-only non-transitory instructions are stored. The volatile memory 1110 and the nonvolatile memory 1114 may include a file storage subsystem providing persistent (non-volatile) storage for program and data files. The volatile memory 1110 and the nonvolatile memory 1114 may include removable storage systems, such as removable flash memory.

The bus subsystem 1118 provides a mechanism for enabling the various components and subsystems of data processing system 1120 communicate with each other as intended. Although the communication network interface 1112 is depicted schematically as a single bus, some embodiments of the bus subsystem 1118 may utilize multiple distinct busses.

It will be readily apparent to one of ordinary skill in the art that the computing device 1100 may be a mobile device such as a smartphone, a desktop computer, a laptop computer, a rack-mounted computer system, a computer server, or a tablet computer device. As commonly known in the art, the computing device 1100 may be implemented as a collection of multiple networked computing devices. Further, the computing device 1100 will typically include operating system logic (not illustrated) the types and nature of which are well known in the art.

Those having skill in the art will appreciate that there are various logic implementations by which processes and/or systems described herein can be effected (e.g., hardware, software, or firmware), and that the preferred vehicle will vary with the context in which the processes are deployed. If an implementer determines that speed and accuracy are paramount, the implementer may opt for a hardware or firmware implementation; alternatively, if flexibility is paramount, the implementer may opt for a solely software implementation; or, yet again alternatively, the implementer may opt for some combination of hardware, software, or firmware. Hence, there are numerous possible implementations by which the processes described herein may be effected, none of which is inherently superior to the other in that any vehicle to be utilized is a choice dependent upon the context in which the implementation will be deployed and the specific concerns (e.g., speed, flexibility, or predictability) of the implementer, any of which may vary. Those skilled in the art will recognize that optical aspects of implementations may involve optically-oriented hardware, software, and or firmware.

Those skilled in the art will appreciate that logic may be distributed throughout one or more devices, and/or may be comprised of combinations memory, media, processing circuits and controllers, other circuits, and so on. Therefore, in the interest of clarity and correctness logic may not always be distinctly illustrated in drawings of devices and systems, although it is inherently present therein. The techniques and procedures described herein may be implemented via logic distributed in one or more computing devices. The particular distribution and choice of logic will vary according to implementation.

The foregoing detailed description has set forth various embodiments of the devices or processes via the use of block diagrams, flowcharts, or examples. Insofar as such block diagrams, flowcharts, or examples contain one or more functions or operations, it will be understood as notorious by those within the art that each function or operation within such block diagrams, flowcharts, or examples can be implemented, individually or collectively, by a wide range of hardware, software, firmware, or virtually any combination thereof. Portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more processing devices (e.g., as one or more programs running on one or more computer systems), as one or more programs running on one or more processors (e.g., as one or more programs running on one or more microprocessors), as firmware, or as virtually any combination thereof, and that designing the circuitry or writing the code for the software or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, flash drives, SD cards, solid state fixed or removable storage, and computer memory.

In a general sense, those skilled in the art will recognize that the various aspects described herein which can be implemented, individually or collectively, by a wide range of hardware, software, firmware, or any combination thereof can be viewed as being composed of various types of circuitry.

Those skilled in the art will recognize that it is common within the art to describe devices or processes in the fashion set forth herein, and thereafter use standard engineering practices to integrate such described devices or processes into larger systems. At least a portion of the devices or processes described herein can be integrated into a network processing system via a reasonable amount of experimentation. Various embodiments are described herein and presented by way of example and not limitation.

What is claimed is:

1. A method of determining dimensional changes attributed to variation of location in a simulation field, comprising:
    receiving data describing a unit cell comprising a plurality of features;
    calculating a spacing to be used between adjacent unit cells so that the features of the unit cell will sample a simulation field;
    correcting the unit cell for proximity effects caused by replicas of the unit cell, the replicas of the unit cell forming a border around the unit cell and positioned relative to the unit cell at the calculated spacing;
    generating an array of unit cells, each unit cell in the array of unit cells being a replica of the unit cell corrected for proximity effects, and positioned relative to neighboring unit cells in the array of unit cells at the calculated spacing;
    dividing the array of unit cells into a plurality of templates, each template framing a respective portion of the array of unit cells, wherein locations of a first portion of the unit cells framed by a first template of the plurality of templates are shifted relative to locations of a second portion of the unit cells framed by a second template of the plurality of templates;
    determining, for each of the plurality of templates, a plurality of critical dimensions each representing a size of a feature of the plurality of features at a location within the simulation field;
    obtaining shift variances of the plurality of features based at least in part on the critical dimensions; and
    determining a dimensional change of a feature of the plurality of features based on a corresponding shift variance of the features.

2. The method of claim 1, wherein the locations of the first portion of the unit cells framed by the first template are shifted in both a horizontal direction and a vertical direction relative to the locations of the second portion of the unit cells framed by the second template.

3. The method of claim 1, wherein determining, for each template, the plurality of critical dimensions comprises simulating each of the plurality of templates independently from the others of the plurality of templates.

4. The method of claim 1, wherein the shift variances of the plurality of features are obtained by simulating implementations of the plurality of features on the simulation field for each of the plurality of templates.

5. The method of claim 1, wherein calculating a spacing to be used between adjacent unit cells comprises calculating a first spacing for a horizontal spacing and a second spacing for a vertical spacing.

6. The method of claim 1, wherein each template of the plurality of templates has a length in a direction different from any integer multiple of a sum of (i) a length of the unit cell in the direction, and (ii) the calculated spacing.

7. The method of claim 1, wherein the calculated spacing is less than an ambit distance, two features separated by at least the ambit distance not causing a proximity effect.

8. The method of claim 1, further comprising generating a plurality of markers for uniquely identifying each of the plurality of features within the unit cell.

9. The method of claim 1, further comprising:
    identifying one of the plurality of features having a shift variance exceeding a predetermined threshold; and
    in response to identifying the feature, correcting a model for performing optical proximity correction.

10. The method of claim 1, further comprising:
    comparing a subset of the critical dimensions associated with a feature, each critical dimension of the feature measured at a different replicas of the unit cell,
    wherein a shift variance of the feature is obtained based on the comparison of the subset of the critical dimensions associated with the feature.

11. The method of claim 1, wherein the spacing is calculated so that the features of the unit cell will sample the simulation field with the exception of a one ambit border for context of the remainder of the simulation field, and the calculated spacing is less than one ambit.

12. A method of determining dimensional changes attributed to variation of location in a simulation field of a unit cell having a plurality of features, the unit cell corrected, using an optical proximity correction (OPC) model, for proximity effects caused by replicas of the unit cell, the replicas of the unit cell forming a border around the unit cell and positioned relative to the unit cell at a calculated spacing, the method comprising:
    dividing an array of unit cells comprising a plurality of unit cells positioned relative to each other at the calculated spacing into a plurality of templates, each template framing a respective portion of the array of unit cells, wherein locations of a first portion of the plurality of unit cells framed by a first template of the plurality of templates are shifted relative to locations of a second portion of the plurality of unit cells framed by a second template of the plurality of templates;
    determining, for each of the plurality of templates, using a simulation algorithm, a plurality of critical dimensions each representing a size of a feature of the plurality of features at a location within the simulation field;
    obtaining shift variances of the plurality of features based at least in part on the critical dimensions;
    determining that the shift variances are above a selected threshold; and
    in response to determining that the shift variances are above the selected threshold, repeating the method with an adjustment to at least one of the OPC model and the simulation algorithm until the shift variance is below the selected threshold.

13. The method of claim 12, further comprising:
in response to determining that the shift variances are below the selected threshold, determining that the OPC model can be used in a design process.

14. The method of claim 11, wherein determining that the shift variances are above a selected threshold comprises comparing each shift variance to the selected threshold and determining that at least one shift variance is above the selected threshold.

15. The method of claim 11, wherein determining that the shift variances are above a selected threshold comprises at least one of:
comparing a minimum shift variance to a selected minimum shift variance threshold, and determining that the minimum shift variance is above the selected minimum shift variance threshold; and
comparing a mean shift variance to a selected mean shift variance threshold, and determining that the mean shift variance is above the selected mean shift variance threshold.

16. The method of claim 11, wherein the locations of the first portion of the unit cells framed by the first template are shifted in both a horizontal direction and a vertical direction relative to the locations of the second portion of the unit cells framed by the second template.

17. The method of claim 11, wherein determining, for each template, the plurality of critical dimensions comprises simulating each of the plurality of templates independently from the others of the plurality of templates.

18. The method of claim 11, wherein the shift variances of the plurality of features are obtained by simulating implementations of the plurality of features on the simulation field for each of the plurality of templates using the simulation algorithm.

19. The method of claim 11, wherein each template of the plurality of templates has a length in a direction different from any integer multiple of a sum of (i) a length of the unit cell in the direction, and (ii) the calculated spacing.

20. The method of claim 11, wherein the calculated spacing is less than an ambit distance, two features separated by at least the ambit distance not causing a proximity effect.

* * * * *